United States Patent Office 3,223,380
Patented Dec. 14, 1965

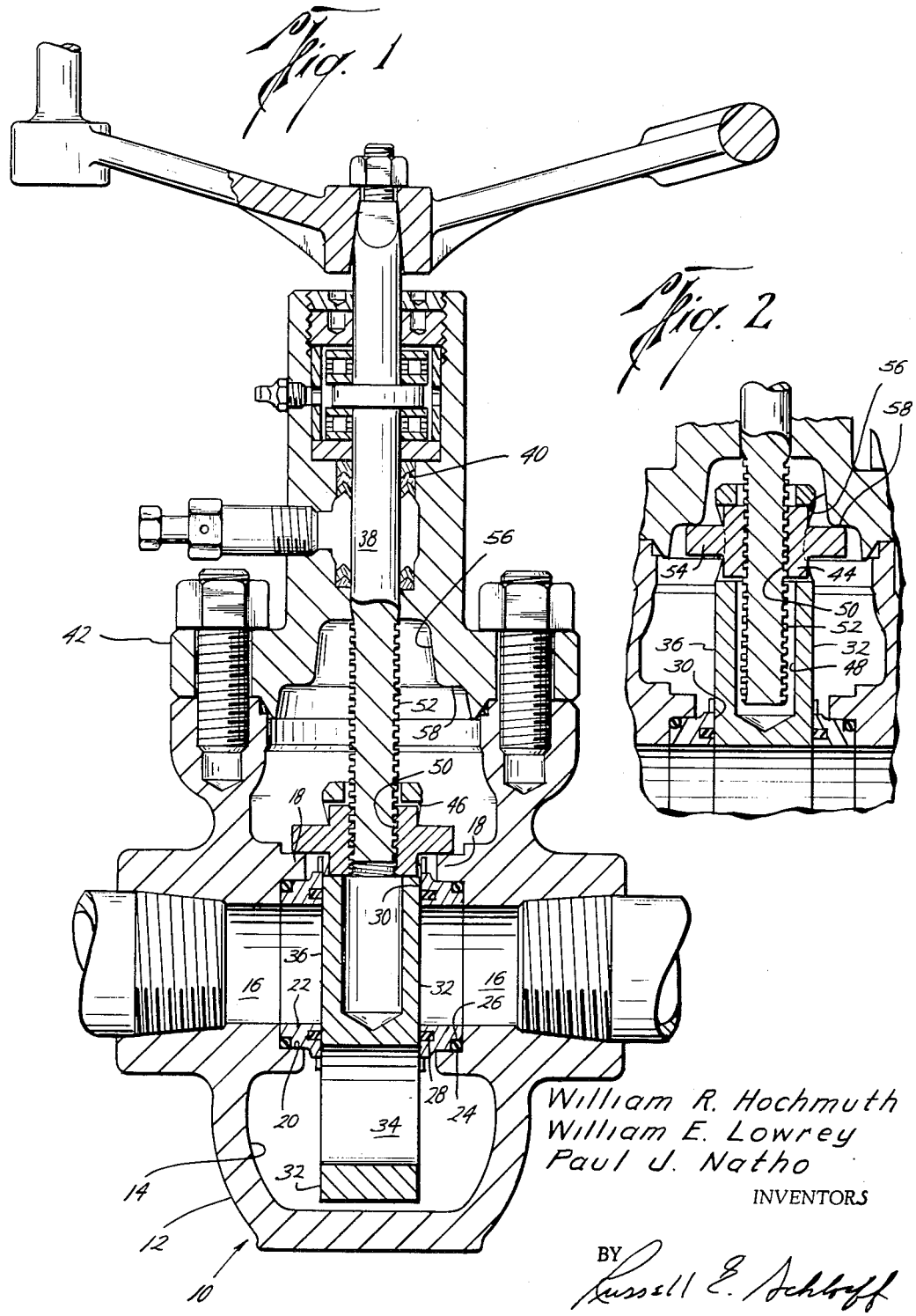

3,223,380
STEM-GATE CONNECTION
William R. Hochmuth, William E. Lowrey, and Paul J. Natho, Houston, Tex., assignors to ACF Industries, Incorporated, New York, N.Y., a corporation of New Jersey
Filed Feb. 1, 1963, Ser. No. 255,480
8 Claims. (Cl. 251—284)

This invention relates to a through conduit slab type gate valve having parallel sealing faces, and more particularly to a stem-gate connection which will retain the sealing faces of the gate and the seats in coplanar relation.

Through conduit type gate valves normally have a valve housing provided with an open ended valve chamber. Diametrically opposed inlet and outlet passageways communicate with the valve chamber and usually terminate in a hub portion which extends into the valve chamber in which is positioned the seat members. A reciprocating, generally rectangular, valve member is located in the valve chamber. The valve member has a transverse passageway which is aligned with the inlet and outlet passageways in the open position to form the run of the valve, and a solid portion having parallel sealing faces which cooperate with the seat members in the closed position to block flow through the valve. In order to provide reciprocatory movement for the gate member, a stem is attached to one end of the valve member. A detachably connected bonnet closes the open ended valve chamber and is provided with a sealed passage through which the stem extends. In a non-rising stem type gate valve the stem is threadedly connected to the valve member and rotation of the stem results in reciprocatory movement of the valve member. It has been customary to limit travel of the gate member by having the gate contact the bottom of the valve chamber in one direction and contact the bonnet in the other direction. In such case, the gate member becomes rigid at the extremity of its travel, and in some cases because of torsional twist resulting from other than full contact the sealing faces of the gate may no longer be in a coplanar relation with the seat members. If the amount of misalignment is greater than the seat members can bridge, leakage will result. This condition results both when the gate forms a seal with the downstream seat and when the upstream seat forms a seal with the gate as in block and bleed type service.

In order to overcome the possibility of torsional twist and rigidity of the valve member, the stem-gate connection of the present invention consists of a cylindrical member positioned in a transverse passage in the outer end of the gate member. The stem is connected to this member. The member has ears which extend past the sealing faces of the gate and contact in the closed position the hub of the inlet and outlet passageways prior to the gate bottoming out. The member has a limited amount of movement to permit free floating of the gate to the downstream seat in the closed position. The ears also contact a portion of the bonnet prior to the gate making contact whereby the gate again remains coplanar with the seats and the upstream seat may float against the upstream sealing face of the gate and make sealing contact isolating the body. This is also true in the closed position permitting block and bleed type operations.

It is the principal object of the present invention to provide a stem-gate connection which will permit the gate to freely float so that the sealing surfaces of the gate and the seat members will always be in a coplanar relation.

It is another object to provide a stem-gate connection for non-rising stem type gate valves which will, in the closed position, stop the travel of the gate before it is bottomed out and becomes rigid thereby retaining the gate free floating so that the sealing faces of the gate and the seat will always be in a coplanar relation.

It is a further object to provide a stem-gate connection which has provisions to allow the gate to float and and will also stop travel of the gate before the gate makes solid contact eliminating torsional twist of the gate.

It is still a further object to provide a stem-gate connection which will limit movement of the gate in both directions prior to the gate itself making solid contact so that the gate remains free floating and the sealing faces of the gate remain coplanar with the faces of the seat members.

It is a more specific object to provide a stem-gate connection for non-rising stem type, through conduit type, slab gate valves which will limit movement of the gate in both directions prior to the gate itself making solid contact so that the gate remains free floating and can, in the closed position, float against the downstream seat in coplanar relation; and for block and bleed service the upstream seat will be in coplanar relation to the upstream sealing face of the gate member.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a cross section of the valve of the present invention showing the gate in the closed position.

FIG. 2 is a fragmentary view similar to FIG. 1 showing the gate in open position.

As can be seen in FIG. 1, the valve selected to illustrate the present invention is a non-rising stem, through conduit, slab type gate valve 10. The valve is formed of a valve housing 12 having an open ended valve chamber 14. Diametrically opposed inlet and outlet passageways 16 communicate with the valve chamber 14 and terminate in hub portions 18 which extend into the valve chamber 14.

Positioned in annular pockets 20 in the hub portions 18 are seat members 22. Each seat member 22 is pressure actuated, when upstream, by an O-ring 24 which is located in a notch 24 in the axial outer corner of the seat 20. Each seat 20 has a deformable plastic sealing ring 28 on its sealing face 30. The sealing ring 28 extends slightly above the plane of the sealing face 30 and forms the initial seal.

Located in the valve chamber 14 is a reciprocating, generally rectangular, slab gate member 32 having a transverse passage 34 which is aligned with the inlet and outlet passageways 16, when the valve is in the open position, to form the run of the valve. The gate member 32 also has a solid portion having parallel sealing faces 36 which cooperate with the seats 22, when the valve is in the closed position to block flow through the valve. In order to move the gate member 32 from one position to another, the gate member 32 is connected to a stem 38 which extends through a sealed passage 40 in a bonnet 42 which is detachably connected to the top of the housing 12.

In order to get a tight seal, it is necessary for the sealing faces 36 of the gate member 32 to be in coplanar relation with the sealing faces 30 of the seats 22. The necessity of the coplanar relation holds true regardless of whether the gate member 32 has floated over against the downstream seat 22 to form a downstream seal or if the upstream seat 22 has floated out of its pocket 22 and an upstream seal is effected. While the coplanar relation is necessary in the closed position for sealing, the coplanar relation is also necessary in the open position in order to isolate valve chamber 14 from the run of the valve in the open position.

In order to achieve the coplanar relation between the sealing faces 36 of the gate member 32 and the sealing faces 30 of the seats 22 in both the open and closed positions, the stem-gate connection of the present invention is such that the gate member 32 may freely float along the run of the valve and the gate member 32 is never rigid due to its contacting either the bottom of the valve chamber 14 or bonnet 42.

To achieve the free floating action of the gate member 32, the stem 38 is attached to the gate member 32 by means of a cylindrical member 44 which is slidingly positioned in a transverse passage 46 near the outer end of the gate member 32. As the valve shown is a non-rising stem type, the gate member has a vertical passage 48 which extends from one end of the gate member and intersects with the transverse passage 46. The cylindrical member 44 has a female threaded portion 50 and the stem 38 has its inner end provided with a male threaded portion 52 which is threadedly engaged with the female threaded portion 50 of the cylindrical member 44. Accordingly, rotation of the stem 38 results in reciprocatory movement of the gate member 32.

The cylindrical member 44 has an ear 54 extending out from each end with the ends extending past the sealing faces 36 of the gate member 32. In the closed position, the ears 54 contact the hub portions 18 of the inlet and outlet passageways and restrain further inward movement of the gate member 32. As can be seen in FIG. 1, the gate member 32 has not touched the bottom of the valve chamber 14 and therefore has not become rigid. Also, torsional twist which could result if there were not full contact between the bottom of the gate and its stop is eliminated. Since vertical passage 48 is slightly larger than the diameter of the stem 38, the gate member 32 can float in coplanar relation to the seats 22. In the closed position, upstream pressure causes the gate member 32 to float downstream in coplanar relation to the downstream seat 22; therefore, the sealing face 36 of the gate member 32 will come into intimate sealing contact with the sealing face 30 of the seat 22. Since the gate member 32 is free floating, the relation between the sealing faces of the gate and seat will be coplanar and sealing is easier to accomplish. Also, if the upstream seat is pressure actuatable as is the seat 22 shown in the valve, the upstream seat 22 will float out in coplanar relation and establish a seal with the upstream side of the gate member 32 enabling the valve to be used in block and bleed service.

The bonnets 42 is so designed that it has a pocket 56 which will receive the upper end of gate member 32 and a stop portion 58 which the ears 54 will contact. As can be seen in FIG. 2, the ears 54 contact the stop portion 58 prior to the top of the gate member contacting the top of the pocket 56. Accordingly, in the open position the gate member 32 will not be rigid, but will be able to freely float along the axis of the run of the valve and as previously mentioned the upstream seat 22 will contact the gate member 32 in coplanar relation. Upstream pressure will again cause the gate member 32 to move in coplanar relation against the downstream seat 22 and the run of the valve will be isolated from the valve chamber 14.

As can be seen from the foregoing, in the valve of the present invention the stem-gate connection is so constructed that the gate member is stopped prior to contacting a solid surface, eliminating torsional twist or canting of the gate which would cause the sealing faces to be out of parallelism with the sealing faces of the seats. Moreover, the stem-gate connection is so designed that the gate member can freely float along the axis of the run of the valve whereby if pressure actuated seats are utilized there will be full parallelism between the upstream sealing face of the gate member and upstream seat and the downstream sealing face of the gate member and the downstream seat.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What we claim is:

1. A gate valve comprising a housing having a valve chamber, diametrically opposed inlet and outlet passageways having hub portions extending into said chamber, a seat member in each of the hub portions, a generally rectangular reciprocating slab gate member in said valve chamber having a transverse passage alignable with the inlet and outlet passageways in the open position and a solid portion having parallel sealing faces cooperating with seat members to block flow in the closed position, a vertical passage extending from one end of the gate member, a transverse passage near said end intersecting said vertical passage, a cylindrical member in said transverse passage having a female threaded passage aligned with the vertical passage in the gate and having ears which extend past the parallel sealing surfaces of the gate member, a stem having male threads engaged with the female threads of the member in the gate member whereby upon rotation of the stem the gate member is reciprocatorily moved, the stem having a smaller diameter than the vertical passage, a detachable bonnet attached to the housing closing the valve chamber having a sealed passage through which the stem extends and having a portion which engages the ears of the cylindrical member in the gate to limit axial outward movement of the gate, the ears of the cylindrical member in the gate engaging the hub portions of the inlet and outlet passageways to limit axial inner movement of the gate whereby the gate member remains free floating in the open and closed positions and the sealing surfaces of the gate remain coplanar with the sealing surfaces of the seat members.

2. A gate valve comprising a housing having a valve chamber, diametrically opposed inlet and outlet passageways having hub portions extending into said valve chamber, a seat member in each of the hub portions, a generally rectangular reciprocating slab gate member in said valve chamber having a transverse passage alignable with the inlet and outlet passageways in the open position and a solid portion having parallel sealing faces cooperating with seat members to block flow in the closed position, a vertical passage extending from one end of the gate member, a transverse passage near said end intersecting said vertical passage, a member slidingly positioned in said transverse passage having a female threaded passage aligned with the vertical passage in the gate and having ears which extend past the parallel sealing surfaces of the gate member, a stem having male threads engaged with the female threads of the member in the gate member whereby upon rotation of the stem the gate member is reciprocatorily moved, the stem having a smaller diameter than the vertical passage, a detachable bonnet attached to the housing closing the valve chamber having a sealed passage through which the stem extends and having a portion which engages the ears of the member in the gate to limit axial outward movement of the gate, the ears of the member in the gate engaging the hub portions of the inlet and outlet passageways to limit axial inner movement of the gate whereby the gate member remains free floating in the open and closed positions and the sealing surfaces of the gate remain coplanar with the sealing surfaces of the seat members.

3. A gate valve comprising a housing having a valve chamber, diametrically opposed inlet and outlet passageways, and having integral hub portions extending into said valve chamber, a seat member in each of the hub portions, a generally rectangular reciprocating slab gate member in said valve chamber having a transverse passage alignable with the inlet and outlet passageways in the open position and a solid portion having parallel sealing faces cooperating with seat members to block flow in the closed position, a vertical passage extending from one end of the gate member, a transverse passage near said end intersecting said vertical passage, a cylindrical member slidingly positioned in said transverse passage having a female threaded passage aligned with the vertical passage in the gate and having ears which extend past the parallel sealing surfaces of the gate member, a stem having male threads engaged with the female threads of the member in the gate member whereby upon rotation of the stem the gate member is reciprocatorily moved, the stem having a smaller diameter than the vertical passage, a detachable bonnet attached to the housing closing the valve chamber having a sealed passage through which the stem extends, the ears of the gate member engaging the hub portions of the inlet and outlet passageways to limit axial inner movement of the gate and said ears engaging said bonnet to limit axial outward movement of said gate whereby the gate member remains free floating in the closed position and the sealing surfaces of the gate remain coplanar with the sealing surfaces of the seat members.

4. A gate valve comprising a housing having a valve chamber, diametrically opposed inlet and outlet passageways having hub portions extending into said valve chamber, a seat member in each of the hub portions, a generally rectangular reciprocating slab gate member in said valve chamber having a transverse passage alignable with the inlet and outlet passageways in the open position and a solid portion having parallel sealing faces cooperating with seat members to block flow in the closed position, a vertical passage extending from one end of the gate member, a transverse passage near said end intersecting said vertical passage, a member in said transverse passage having a female threaded passage aligned with the vertical passage in the gate and having ears which extend past the parallel sealing surfaces of the gate member, a stem having male threads engaged with the female threads of the member in the gate member whereby upon rotation of the stem the gate member is reciprocatorily moved, the stem having a smaller diameter than the vertical passage, a detachable bonnet attached to the housing closing the valve chamber having a sealed passage through which the stem extends, the ears of the gate member engaging the hub portions of the inlet and outlet passageways to limit axial inner movement of the gate and said ears engaging said bonnet to limit axial outward movement of said gate whereby the gate member remains free floating in the closed position and the sealing surfaces of the gate remain coplanar with the sealing surfaces of the seat members.

5. A gate valve comprising a housing having a valve chamber, diametrically opposed inlet and outlet passageways having hub portions extending into said valve chamber, a seat member in each of the hub portions, a generally rectangular reciprocating slab gate member in said valve chamber having a transverse passage alignable with the inlet and outlet passageways in the open position and a solid portion having parallel sealing faces cooperating with seat members to block flow in the closed position, a vertical passage extending from one end of the gate member, a transverse passage near said end intersecting said vertical passage, a cylindrical member in said transverse passage having a female threaded passage aligned with the vertical passage in the gate and having ears which extend past the parallel sealing surfaces of the gate member, a stem having male threads engaged with the female threads of the member in the gate member, a detachable bonnet attached to the housing closing the valve chamber having a sealed passage through which the stem extends and having a portion which engages the ears of the cylindrical member in the gate to limit axial outward movement of the gate, the ears of the cylindrical member of the gate engaging the hub portions of the inlet and outlet passageways to limit axial inner movement of the gate whereby the gate member remains free floating in the open and closed positions and the sealing surfaces of the gate remain coplanar with the sealing surfaces of the seat members.

6. A gate valve comprising a housing having a valve chamber, diametrically opposed inlet and outlet passageways having hub portions extending into said valve chamber, a seat member in each of the hub portions, a reciprocating slab gate member in said valve chamber having a transverse passage alignable with the inlet and outlet passageways in the open position and a solid portion having sealing faces cooperating with seat members to block flow in the closed position, a vertical passage extending from one end of the gate member, a transverse passage near said end intersecting said vertical passage, a member in said transverse passage having a passage aligned with the vertical passage in the gate and having ears which extend past the parallel sealing surfaces of the gate member, a stem having a male portion engaged with the passage of the member in the gate member, a detachable bonnet attached to the housing closing the valve chamber having a sealed passage through which the stem extends and having a portion which engages the ears of the member in the gate to limit axial outward movement of the gate, the ears of the member of the gate engaging the hub portions of the inlet and outlet passageways to limit axial inner movement of the gate whereby the gate member remains free floating in the open and closed positions and the sealing surfaces of the gate remain coplanar with the sealing surfaces of the seat members.

7. A gate valve comprising a housing having a valve chamber, diametrically opposed inlet and outlet passageways having hub portions extending into said valve chamber, a seat member in each of the hub portions, a reciprocating gate member in said valve chamber having a transverse passage alignable with the inlet and outlet passageways in the open position and a solid portion having sealing faces cooperating with seat members to block flow in the closed position, a vertical passage extending from one end of the gate member, a transverse passage near said end intersecting said vertical passage, a member slidingly positioned in said transverse passage having a female threaded passage aligned with the vertical passage in the gate and having ears which extend past the sealing surfaces of the gate member, a stem having male threads engaged with the female threads of the member in the gate member whereby upon rotation of the stem the gate member is reciprocatorily moved, a detachable bonnet attached to the housing closing the valve chamber having a sealed passage through which the stem extends and having a portion which engages the ears of the members in the gate to limit axial outward movement of the gate, the ears of the member of the gate engaging the hub portions to limit axial inner movement of the gate whereby the gate member remains free floating in the open and closed positions and the sealing surfaces of the gate remain coplanar with the sealing surfaces of the seat members.

8. A gate valve comprising a housing having a valve chamber, diametrically opposed inlet and outlet passageways having hub portions extending into said valve chamber, a seat member in each of the hub portions, a reciprocating gate member in said valve chamber having a transverse passage alignable with the inlet and outlet passageways in the open position and a solid portion having sealing faces cooperating with seat members to clock flow in the closed position, a vertical passage extending from one end of the gate member, a transverse passage near said end intersecting said vertical passage, a member slidingly positioned in said transverse passage having a passage aligned with the vertical passage in the gate and having ears which extend past the sealing surfaces of the gate member, a stem having a male portion engaged with the passage of the member in the gate member, a detachable bonnet attached to the housing closing the valve chamber having a sealed passage through which the stem extends, the ears of the member of the gate engaging the hub portions to limit axial inner movement of the gate and said ears engaging said bonnet to limit axial outward movement of said gate whereby the gate member remains free floating in the closed position and the sealing surface of the gate remain coplanar with the sealing surfaces of the seat members.

References Cited by the Examiner

UNITED STATES PATENTS

| | | | |
|---|---|---|---|
| 243,846 | 7/1881 | Buick | 251—327 |
| 659,234 | 10/1900 | Hughes | 251—327 X |
| 697,598 | 4/1902 | Baker | 251—284 X |
| 2,726,842 | 12/1955 | Seamark | 251—172 |

OTHER REFERENCES

Klein: German printed application 1,124,774, March 1, 1962, pp. 251–327.

M. CARY NELSON, *Primary Examiner.*

L. D. GEIGER, *Examiner.*